Dec. 1, 1959 E. W. LUSTED 2,915,340
PRESSURE EQUALIZER FOR DISCHARGE VESSELS
Filed Dec. 23, 1958 2 Sheets-Sheet 1
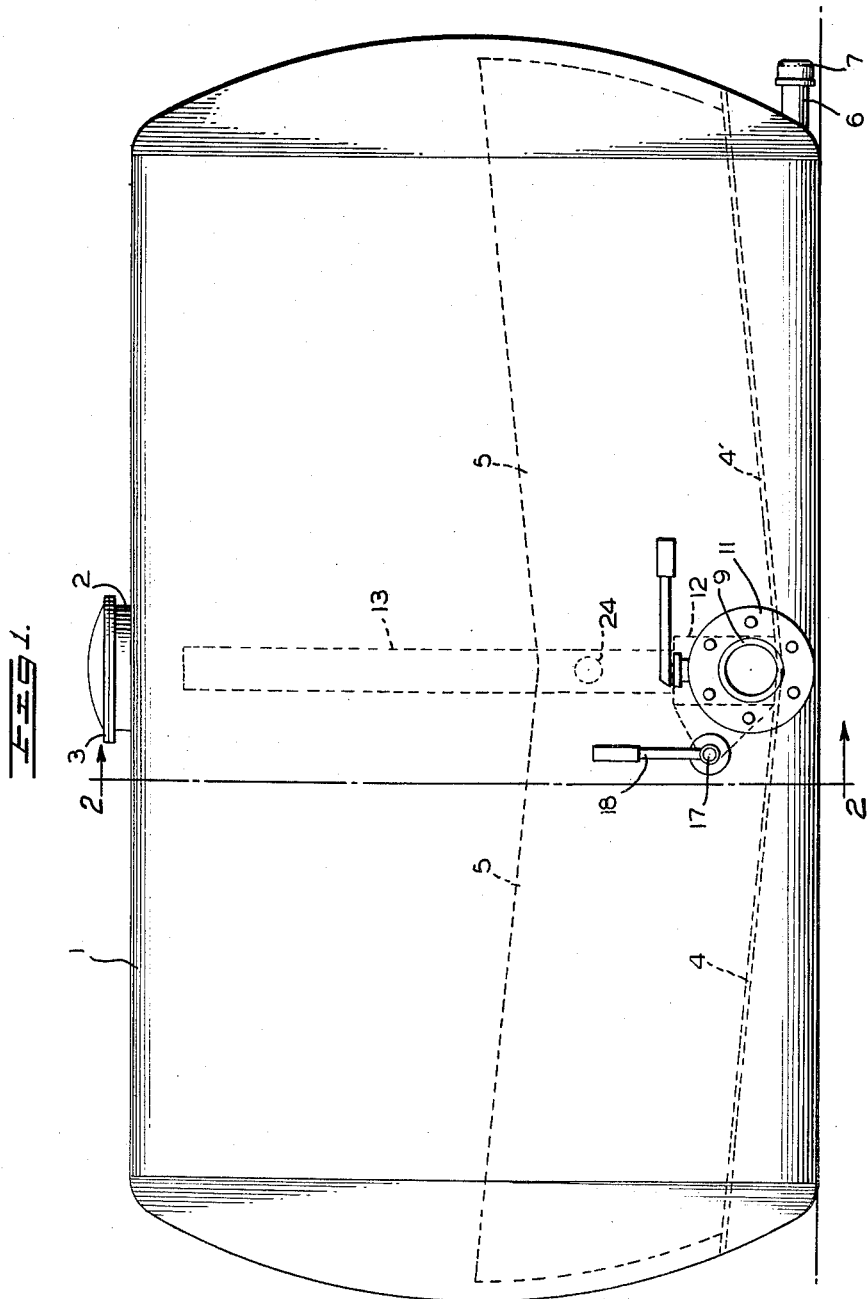
INVENTOR.
EMILE W. LUSTED
BY
ATTORNEYS

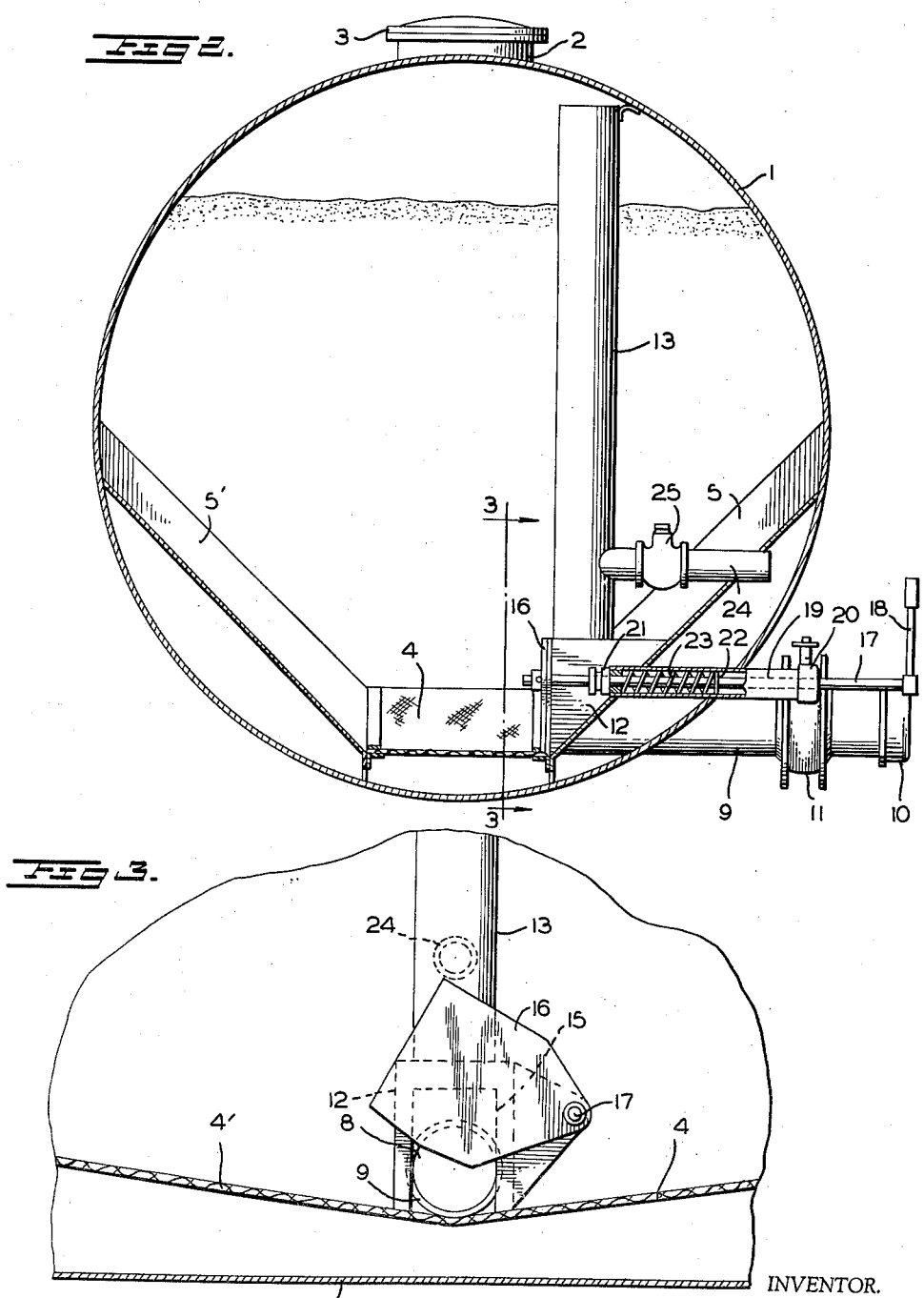

United States Patent Office 2,915,340
Patented Dec. 1, 1959

2,915,340

PRESSURE EQUALIZER FOR DISCHARGE VESSELS

Emile W. Lusted, Baton Rouge, La., assignor, by mesne assignments, to Fuller Company, Catasauqua, Pa., a corporation of Delaware Application December 23, 1958, Serial No. 782,556

11 Claims. (Cl. 302—53)

This invention relates to a vessel in which pulverulent material may be stored and from which it subsequently may be discharged in suspension into and carried through a pneumatic conveying line to any desired location.

In the application of Robert F. Loomis, Serial No. 678,798, filed August 19, 1957, now Patent No. 2,891,817, there is disclosed and claimed a pressurized vessel for the storage and subsequent discharge of pulverulent material into a conveyor line in which the gas for carrying the material through the conveyor line is taken from the pressure gas in the upper portion of the vessel. The vessel of that application has a gas-permeable deck spaced a slight distance from the bottom and inclined downwardly towards a discharge outlet which communicates with the conveying line. The vessel is provided with baffling means to prevent free flow of the material in the vessel through the discharge outlet. The baffle has an opening adjacent the gas-permeable deck through which the material may flow to be discharged through the outlet and means are provided to cause pressure gas from the upper part of the vessel to flow as a stream past the opening in the baffle and through the discharge outlet. In operation, gas is introduced into the plenum chamber formed between the bottom of the vessel and the gas-permeable deck and passes upwardly through the deck and into the overlying pulverulent material, fluidizing the same. The fluidized material flows downwardly along the upper surface of the inclined deck and through the opening in the baffle to the discharge outlet and connected conveyor line. Since the vessel is sealed, the gas which passes from the upper surface of the fluidized material builds up a pressure in the upper portion of the vessel and upon continued introduction of the gas, the gas is caused to flow, as a stream, downwardly past the opening in the baffling means and through the discharge outlet. This downwardly-flowing stream of gas flows over and entrains the material on the lower end of the deck which has passed through the opening in the baffle and carries it in suspension into and through the conveyor line to the desired location.

The present invention relates to a storage and discharge vessel of the general type disclosed in the foresaid application but in which the gas-permeable deck is of substantially less width and extends longitudinally along the center of the vessel, and slope sheets extend from the longitudinal side edges of the gas-permeable deck upwardly and outwardly to the adjacent sides of the vessel. These slope sheets are inclined at an angle greater than the angle of repose of the pulverulent material to be stored in the vessel, when said material is in an unaerated state, so that the material will flow downwardly along such slope sheets to the gas-permeable deck to be fluidized by the gas passing upwardly therethrough. The space beneath the slope sheets is in open communication with the plenum chamber beneath the gas-permeable deck.

In a storage and discharge vessel of the type just disclosed, if a condition should arise to suddenly cause a lower pressure to exist in the plenum chamber and the space beneath the slope sheets, for example, a connection failure between the air inlet to such space and the blower, or any other sudden failure of supply of gas to such space, the resulting high pressure differential between the space beneath the gas-permeable deck and the slope sheets and the space within the main portion of the chamber above the gas-permeable deck and slope sheets would result in undue stresses being applied to the gas-permeable deck and the slope sheets, which stresses might be greater than the gas-permeable deck and slope sheets were constructed to withstand.

In accordance with the present invention, means are provided for equalizing the pressure of the gas within the main portion of the vessel above the gas-permeable deck and the slope sheets and the space beneath the slope sheets and gas-permeable deck upon the occurrence of any condition which would cause an appreciably higher pressure to exist in the main portion of the vessel than exists beneath the gas-permeable deck or slope sheets. To that end, the invention includes conduit means forming a communication between the space beneath the slope sheets and the gas-permeable deck and the passageway for the pressure gas from the upper portion of the vessel to the discharge outlet, and the provision in such conduit means of a check valve which will close on pressure exerted against it from beneath the slope sheets and gas-permeable deck, but which will open upon pressure exerted against it from the side in communication with the main portion of the vessel. Thus, upon the occurrence of any condition which will cause a greater pressure to exist in the main portion of the vessel than exists beneath the gas-permeable deck and slope sheets, the higher pressure gas from within the main portion of the vessel will flow through such passage to the space beneath the slope sheets and gas-permeable deck until the pressure differential therebetween is substantially reduced or equalized.

The invention will be further described in connection with the accompanying drawings, in which:

Fig. 1 is a side elevational view of a storage and discharge vessel embodying the invention;

Fig. 2 is a vertical transverse sectional view on line 2—2 of Fig. 1; and

Fig. 3 is a detailed sectional view on line 3—3 of Fig. 2.

Referring now to the drawings, the storage vessel in which the pulverulent material is to be stored and subsequently discharged is designated by reference character 1. It may be of any shape and may be stationary, portable, or may form the vessel for a railroad car or other wheeled vehicle. The top side of the vessel has a filling neck 2 through which pulverulent material may be introduced into the vessel. When the filling neck is not being used, it is sealed by a closure 3 of any suitable kind.

Gas-permeable decks 4 and 4' extend lengthwise of the vessel and slope from the respective ends of the vessel to the longitudinal center thereof. Slope sheets 5 and 5' extend from the longitudinal sides of the gas-permeable decks upwardly and outwardly to the adjacent sides of the vessel. The slope sheets slope downwardly towards the gas-permeable decks at an angle greater than the angle of repose of the pulverulent material to be stored in the vessel, when such material is in its unaerated state, so that the pulverulent material will always flow downwardly along the slope sheets to the gas-permeable decks.

The space beneath both slope sheets is in direct communication with the space beneath the gas-permeable decks to provide a plenum chamber into which a suitable gas, in most instances air, may be introduced to pass upwardly through the gas-permeable decks to fluidize the pulverulent material thereon and to cause it to flow along the upper surface of the decks from each end of the vessel towards the longitudinal center thereof. Such gas may be introduced into the plenum chamber through a gas inlet 6 located at one end of the vessel. When gas is not being introduced through the inlet, the inlet may be closed by a suitable cap 7 to keep out foreign matter.

The lower edge portion of the slope sheet 5 is provided with a discharge outlet 8 at the longitudinal center thereof, where the lower ends of the gas-permeable decks extending from each end of the vessel meet. A discharge pipe 9 extends from the discharge outlet 8 and connects to a conveyor line. Pulverulent material fluidized on the gas-permeable decks and flowing therealong to the low point at the longitudinal center of the vessel may be discharged through the discharge outlet into the discharge pipe 9 to be carried, in suspension, to any desired location. When material is not being discharged from the vessel, the outer end of the discharge pipe 9 is closed by a suitable cap 10 to prevent the entrance of foreign matter into the vessel. The discharge pipe 9 is provided with a valve 11 for closing the pipe while the vessel is not in use or is in transit, to prevent entrance of foreign matter into or leakage of material from the pipe.

Within the vessel, and surrounding the discharge outlet 8 is a housing 12. A gas conduit 13 extends from the top of the housing upwardly to adjacent the top of the vessel. The housing 12 and conduit 13 form baffling means preventing free flow of the pulverulent material from the vessel through the outlet 8, and the conduit 13 forms a passageway through which pressure gas in the upper portion of the vessel may flow, as a stream, downwardly to the housing 12 and out through the discharge outlet 8, discharge pipe 9 and into a connected conveyor line, as will be more fully described.

The inner wall of the housing 12 has a rectangular opening 15 formed therein opposite the discharge outlet 8, through which material fluidized on the gas-permeable decks may flow to the discharge outlet. The flow of fluidized material from the gas-permeable decks through the opening 15 is controlled by a swinging valve 16 fixedly secured to the inner end of a shaft 17 which extends through the slope sheet 5 and the side wall of the vessel to a location outside the vessel. The inner wall of the housing 12 having the opening 15 and valve 16 form on effective discharge control valve means for regulating the flow of the fluidized pulverulent material from the vessel through the discharge outlet 8. The outer end of the shaft 17 carries a handle 18 by means of which the shaft may be rotated and the swinging valve 16 swung to cover or uncover the opening 15 in the housing to any desired extent.

The shaft 17 passes through a cylinder 19 mounted in the slope sheet 5' and the adjacent side wall of the vessel. The outer end of the cylinder is closed by a cap 20 which has an opening therethrough through which the shaft 17 extends. The cap 20 forms a bearing for the outer portion of the shaft. The inner end of the cylinder carries a packing gland 21 through which the shaft 17 extends and which makes a tight seal around the shaft. The shaft 17 has a stop washer 22 secured to it where it passes through the cylinder 19. A compression coil spring 23 surrounds the shaft between the inner end of the packing gland 21 and the stop washer 22 and exerts a force against the stop washer tending to urge the shaft outwardly of the cylinder. This causes a resilient force to be exerted on the swinging valve 16 which maintains it in contact with the inner face of the housing 12 having the opening 15 therein.

The means just described for operating the swinging valve forms no part of the present invention and is disclosed and claimed in an application of Isidore Herbert Friedman, Jr., Serial No. 782,557, filed December 23, 1958.

If desired, suitable means may be provided outside the tank to indicate the extent to which the valve 16 has uncovered the opening 15 to permit flow of pulverulent material from the vessel through the discharge outlet.

To provide for the equalization of the pressure in the main portion of the vessel above the gas-permeable decks and the slope sheets and below the gas-permeable decks and slope sheets, a pipe 24 leads from the space beneath the gas-permeable decks and slope sheets to the gas conduit 13 extending from the top of the housing 12 to the upper portion of the vessel. The pipe 24 is provided with a check valve 25 which closes against pressure exerted on it from beneath the slope sheets and gas-permeable deck, but which will open on pressure exerted on it from within the main part of the vessel, downwardly through the conduit 13. Upon the happening of any condition, such as a failure between the gas inlet 6 and a blower or other source of air supply, whereby an appreciably lower pressure is caused to exist in the space beneath the gas-permeable decks and the slope sheets than exists in the main portion of the vessel, gas will flow from the upper part of the vessel downwardly through the gas conduit 13, check valve 25 and pipe 24 to the space beneath the slope sheets and the gas-permeable decks until the pressure above and below the slope sheets and gas-permeable decks is substantially equalized. Thus, any damage to the slope sheets or the gas-permeable decks because of the existence of a higher pressure above them than they are constructed to withstand will be avoided. Equalization of the pressure, or at least substantial reduction of the pressure differential between the space in the main portion of the vessel and the space beneath the slope sheets, in this manner is particularly desirable since substantial reduction of the pressure differential cannot be obtained by reverse flow of gas from the vessel downwardly through the gas-permeable deck into the plenum chamber and the space beneath the slope sheets. Upon any tendency of reverse flow of gases through the gas-permeable deck, the fluidized pulverulent material is collapsed and compacted against the upper surface of the deck in a gas-impermeable layer which prevents any substantial reduction of the pressure differential across the gas-permeable deck.

In the operation of the vessel, when it is desired to discharge pulverulent material contained therein through a conveyor line to a desired location, the gas inlet pipe 16 is connected to a suitable source of gas supply and gas is forced into the plenum chamber beneath the gas-permeable decks and the slope sheets. The gas passes upwardly through the gas-permeable deck and fluidizes the overlying pulverulent material and, on leaving the upper surface of the fluidized bed, accumulates in the upper portion of the vessel, under pressure, and passes as a flowing stream downwardly through the gas conduit 13, housing 12 and out through the discharge outlet 8 and discharge pipe 9 into a conveyor line connected to the outer end of the discharge pipe.

After the pulverulent material overlying the gas-permeable decks has been fluidized and the valve 11 set to the desired opening, the handle 18 is rotated to open the discharge control valve 16 to permit the desired flow of the fluidized pulverulent material from the lower end of the gas-permeable deck through the opening 15 in the inner face of the housing 12. The gas stream flowing from the upper portion of the vessel downwardly through the gas conduit 13, housing 12 and outwardly through the discharge pipe 9 and into the conveyor line entrains the fluidized pulverulent material as it passes through the discharge control valve and carries it, in suspension, through the conveyor line to the desired location. As long as pulverulent material remains in the vessel, and gas is supplied to the plenum chamber, it will flow downwardly along the slope sheets onto the gas-permeable decks and be fluidized by the gas passing upwardly through the gas-permeable decks and caused to flow downwardly along them to the discharge control valve and through it and the discharge pipe to the conveyor line.

Various changes may be made in the details of construction of the apparatus disclosed herein without departing from the invention or sacrificing any of the advantages thereof.

I claim:

1. Apparatus for discharging pulverulent material comprising a vessel, a gas-permeable deck in the lower region of the vessel, a plenum chamber beneath the gas-permeable deck, means for introducing gas under pressure into said plenum chamber to pass upwardly through the gas-permeable deck into overlying pulverulent material to fluidize such material and to cause it to flow along said deck, said vessel having a discharge outlet in its lower region, said discharge outlet forming the exit for material and gas from said vessel, baffling means within the vessel forming at least in part a gas conduit and restraining the bulk of the material in the vessel against unrestricted flow to the discharge outlet, the lower end of said gas conduit being in communication with said discharge outlet and its upper end terminating within the upper portion of the vessel, a discharge control valve at the discharge end of the gas-permeable deck for controlling the flow of fluidized pulverulent material from the gas-permeable deck to said discharge outlet, and means for reducing the pressure differential between the plenum chamber and the space in the vessel above the gas-permeable deck upon the occurrence of a substantially lower pressure in the plenum chamber than exists in the vessel above the gas-permeable deck.

2. Apparatus as set forth in claim 1, in which said pressure-equalization means comprises conduit means connecting the space in the plenum chamber with the space in the vessel above the gas-permeable deck.

3. Apparatus as set forth in claim 2, in which said conduit means connects the space in the plenum chamber with the gas conduit for the passage of gas from the upper portion of the vessel to said discharge outlet, and said conduit means includes a check valve which opens to permit passage of gas when pressure is exerted on it from the space in the vessel above the plenum chamber.

4. Apparatus as set forth in claim 1, in which the gas-permeable deck extends along the central portion of the vessel, slope sheets extend from opposite sides of the gas-permeable deck upwardly and outwardly to opposite sides of the vessel, and the space beneath both slope sheets is in free communication with the plenum chamber.

5. Apparatus as set forth in claim 1, in which the gas-permeable deck is of less width than the vessel, a slope sheet extends from at least one side of the gas-permeable deck upwardly and outwardly to a side of the vessel, and the space beneath said slope sheet is in free communication with the plenum chamber.

6. Apparatus as set forth in claim 5, in which said pressure-equalization means comprises conduit means connecting the space beneath said slope sheet with the space in the vessel above the gas-permeable deck and the slope sheet.

7. Apparatus as set forth in claim 6, in which said conduit means is a pipe connecting the space beneath said slope sheet with the gas conduit for the passage of gas from the upper portion of the vessel to said discharge outlet, and a check valve, which opens when pressure is exerted on it from the space in the vessel above the plenum chamber and the slope sheet, is positioned in said pipe.

8. Apparatus for the storage of pulverulent material comprising a vessel, a gas-permeable deck in the lower region of the vessel, a plenum chamber beneath the gas-permeable deck, means for introducing gas under pressure into said plenum chamber to pass upwardly through said gas-permeable deck into overlying pulverulent material to fluidize such material, and means for reducing the pressure differential between the plenum chamber and the space in the vessel above the gas-permeable deck upon the occurrence of a substantially lower pressure in the plenum chamber than exists in the vessel above the gas-permeable deck.

9. Apparatus as set forth in claim 8 including means for substantially equalizing the pressures in the plenum chamber and in the vessel above the gas-permeable deck.

10. Apparatus as set forth in claim 8, in which said pressure-equalization means comprises conduit means connecting the space in the plenum chamber with the space in the vessel above the gas-permeable deck and a check valve in said conduit means which opens to permit passage of gas when pressure is exerted on it from the space in the vessel above the plenum chamber.

11. Apparatus for discharging pulverulent material comprising a vessel, a gas-permeable deck adjacent the bottom of the vessel, a plenum chamber beneath the gas-permeable deck, means for introducing gas under pressure into said plenum chamber to pass upwardly through the gas-permeable deck into overlying pulverulent material to fluidize such material and to cause it to flow along said deck, said vessel having a discharge outlet adjacent its bottom, said discharge outlet forming the exit for material and gas from said vessel, the gas-permeable deck having a discharge end adjacent said discharge outlet, a housing surrounding the discharge outlet, a gas conduit, the lower end of said gas conduit being in communication with said housing and its upper end terminating within the upper portion of the vessel, a discharge control valve at the discharge end of the gas-permeable deck for controlling the flow of fluidized pulverulent material from the gas-permeable deck to said discharge outlet, and means for substantially equalizing the pressure in the plenum chamber and in the vessel above the gas-permeable deck upon the occurrence of a substantially lower pressure in the plenum chamber than exists in the vessel above the gas-permeable deck.

References Cited in the file of this patent

UNITED STATES PATENTS 2,565,835     Adams ---------------- Aug. 28, 1951

FOREIGN PATENTS 751,162     Great Britain ---------- June 27, 1956

UNITED STATES PATENT OFFICE
CERTIFICATE OF CORRECTION

Patent No. 2,915,340                                              December 1, 1959

Emile W. Lusted

It is hereby certified that error appears in the above numbered patent requiring correction and that the said Letters Patent should read as corrected below.

In the grant, lines 2 and 3, for "assignor, by mesne assignments, to Fuller Company, of Catasauqua, Pennsylvania, a corporation of Delaware," read -- assignor, by direct and mesne assignments, of one-half to Delta Tank Mfg. Co., Inc., of Baton Rouge, Louisiana, a corporation of Louisiana, and one-half to Fuller Company, of Catasauqua, Pennsylvania, a corporation of Delaware, --; line 12, for "Fuller Company, its successors" read -- Delta Tank Mfg. Co., Inc., and Fuller Company, their successors --; in the heading to the printed specification, lines 3 to 5, for "assignor, by mesne assignments, to Fuller Company, Catasauqua, Pa., a corporation of Delaware" read -- assignor, by direct and mesne assignments, of one-half to Delta Tank Mfg. Co., Inc., Baton Rouge, La., a corporation of Louisiana, and one-half to Fuller Company, Catasauqua, Pa., a corporation of Delaware --; column 3, line 44, for "on" read -- an --.

Signed and sealed this 31st day of May 1960.

(SEAL)
Attest:
KARL H. AXLINE
Attesting Officer

ROBERT C. WATSON
                                                                     Commissioner of Patents